Oct. 4, 1977

United States Patent [19]
Bayles

[11] 4,051,768
[45] Oct. 4, 1977

[54] CONVERSION KIT FOR AN AUTOMOBILE AIR CONDITIONING UNIT

[76] Inventor: Wayne Bayles, 6006 Craig St., Springfield, Va. 22150

[21] Appl. No.: 738,241

[22] Filed: Nov. 2, 1976

[51] Int. Cl.$^2$ .............................................. B60H 1/00
[52] U.S. Cl. ........................................ 98/2; 62/244; 98/40 C; 285/9 M
[58] Field of Search ............... 98/DIG. 7, 1, 2, 40 C, 98/114; 62/244, 262; 165/41, 42, 54, 56, 57, 76; 285/9 M

[56] References Cited

U.S. PATENT DOCUMENTS

| | | | |
|---|---|---|---|
| 2,730,866 | 1/1956 | Baker et al. ........................... | 98/40 C |
| 3,151,695 | 10/1964 | Mintz ................... | 285/9 M |
| 3,181,895 | 5/1965 | Cator ................... | 285/9 M |
| 3,280,896 | 10/1966 | Goodson et al. .................... | 285/9 M |
| 3,757,851 | 9/1973 | Marble .................................. | 165/41 |
| 3,916,639 | 11/1975 | Atkinson ............................... | 62/244 |

Primary Examiner—William E. Wayner
Assistant Examiner—Robert J. Charvat

[57] ABSTRACT

A conversion kit for an automobile air conditioning unit includes a rectangularly shaped frame formed from a ferrous metal which is secured by an adhesive backing to an automobile's dashboard around an air register of the air conditioner. An elongated flexible thermoplastic tube member has a continuous bore therethrough and a pair of open ends. A frame element is affixed to one end of the tube member and the other end of the tube member extends into a rear portion of the interior of the automobile. A magnetic flexible gasket is secured to the frame element, wherein the gasket is magnetically secured to the metal frame.

2 Claims, 4 Drawing Figures

U.S. Patent    Oct. 4, 1977    4,051,768
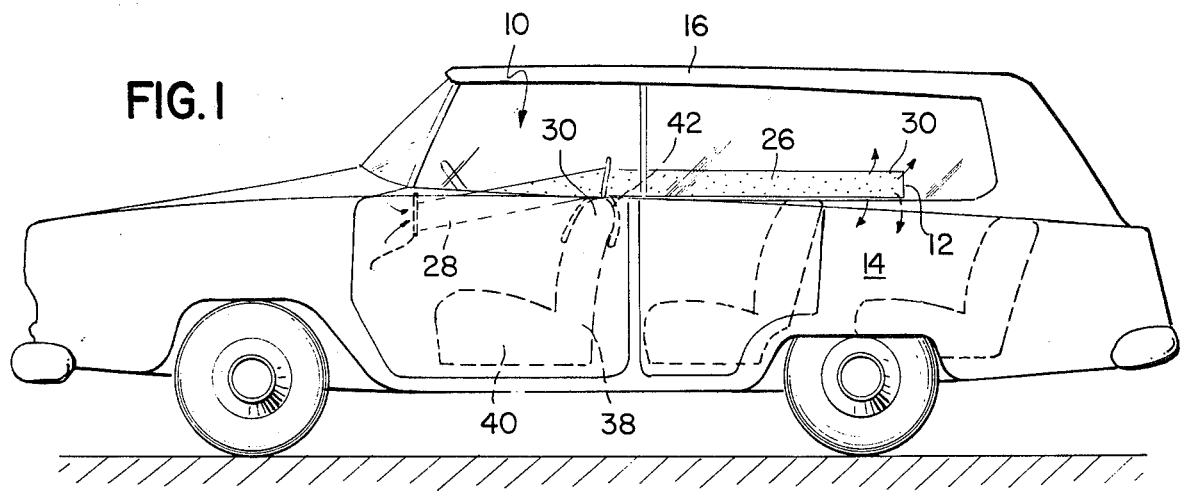
FIG. 1
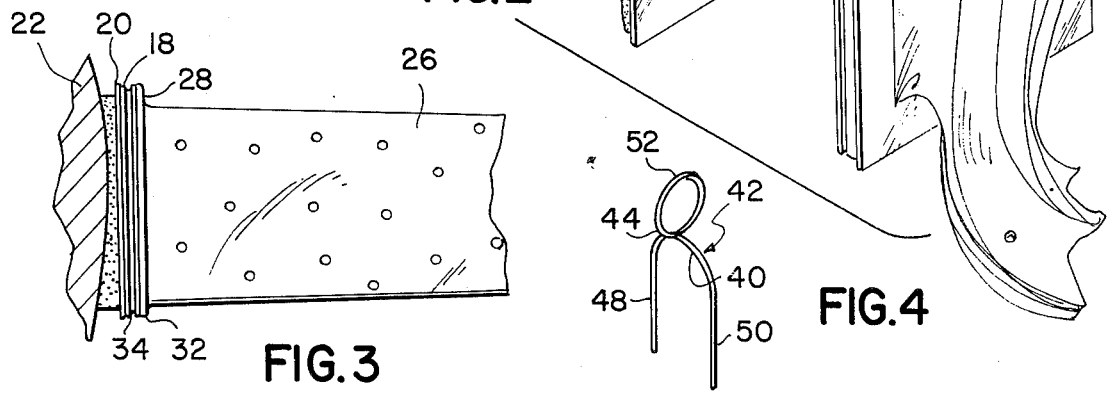
FIG. 2
FIG. 3
FIG. 4

CONVERSION KIT FOR AN AUTOMOBILE AIR CONDITIONING UNIT

BACKGROUND OF THE INVENTION

A number of U.S. Patents relate to variously designed air conditioning and heating devices, but these are non applicable to the conversion kit for an air conditioner of an automobile of my present invention. These U.S. Patents are: U.S. Pat. No. 1,922,133 to Houglum; U.S. Pat. No. 2,048,217 to Peterson; U.S. Pat. No. 2,051,999 to Nielsen; and U.S. Pat. No. 2,268,478 to Fehrer.

SUMMARY OF THE INVENTION

My present invention relates to a unique and novel conversion kit for an automobile air conditioning unit.

An object of my present invention is to provide a conversion kit for an automobile air conditioning unit which will enable cool air to be readily transported to a rear portion of an interior of an automobile, wherein the conversion kit is readily installed and can be easily disassembled for storage.

Briefly my present invention comprises an automobile air conditioning conversion kit including a rectangularly shaped frame formed from a ferrous metal which is secured by an adhesive backing to an automobile's dashboard around an air register of the air conditioner. An elongated flexible thermoplastic tube member has a continuous bore therethrough and a pair of open ends. A frame element is affixed to one end of the tube member and the other end of the tube member extends into a rear portion of the interior of the automobile. A magnetic flexible gasket is secured to the frame element, wherein the gasket is magnetically secured to the metal frame.

BRIEF DESCRIPTION OF THE DRAWING

The objects and features of the invention may be understood with reference to the following detailed description of an illustrative embodiment of the invention, taken together with the accompanying drawings in which:

FIG. 1 illustrates a side cross sectional view of an automobile air conditioning conversion kit installed in an automobile;

FIG. 2 illustrates a perspective view of the component portions of the kit in an unassembled state;

FIG. 3 illustrates an exploded side view of the attachment means of the tube of the kit to an air register; and FIG. 4 illustrates a side view of the clamping means for the tube of the kit.

DETAILED DESCRIPTION OF THE PREFERRED EMBODIMENT

Turning now descriptively to the drawings, in which similar reference characters denote similar elements throughout the several views, FIGS. 1-3 show a kit 10 for converting an automobile air conditioning unit to transfer cool air 12 to the rear portion 14 of an interior of an automobile 16. The kit 10 includes a rectangularly shaped ferrous metallic frame 18 having an adhesive coating 20 deposited on a rear surface 22 of the frame 18. The frame 18 is adhesive secured to the dashboard 22 of the automobile 16 around the air register 24 of the air conditioning unit. An elongated flexible thermoplastic tubularly shaped member 26 has a pair of open ends 28, 30, and a continuous bore 32 therethrough. A rectangularly shaped frame element 32 is affixed in an air tight seal to one end 28 of member 26. A magnetic rubberized gasket 34 is adhesively affixed to frame element 32 on the opposite side of member 26, wherein gasket 34 is removably, magnetically secured onto frame 18 in air tight seal. The other end 30 of member 26 is extended over the upper edge 30 of the back rest 38 of the front seat 40 into the rear portion 14. An optional clamp means 42 as shown in FIG. 4 can be provided for securing member 26 to back rest 38, wherein means 42 comprises an inverted U shaped spring clamp 44 having a base 46 and a pair of legs 48, 50, wherein base 46 engages the upper edge 30 and the legs 48, 50 engage the front and back of the back rest 38. An annular flange member 52 is affixed to base 46 and extends linearly outwardly therefrom such that member 52 is disposed above backrest 38 such that member 26 passes therethrough.

Since obvious changes may be made in the specific embodiment of the invention described herein, such modifications being within the spirit and scope of the invention claimed, it is indicated that all matter contained herein is intended as illustrative and not as limiting in scope.

I claim:

1. A conversion kit for transfering cool air of an automobile air conditioning unit to a rear portion of an interior of an automobile, which comprises:
   a. a rectangularly shaped frame formed from a ferrous metal;
   b. an adhesive backing disposed on one side of said metal frame, said adhesive backing adapted to be adhesively secured to a dashboard of said automobile around an air register of said air conditioning unit;
   c. an elongated flexible thermoplastic tube member having a pair of open ends and a continuous bore therethrough;
   d. a rectangularly shaped frame element affixed to one said end of said tube member, another said end of said tube member extending into said rear portion of said interior of said automobile; and
   e. a magnetic flexible gasket adhesively secured to said frame element, said gasket magnetically affixed to said metallic frame.

2. A kit according to claim 1, further comprising a clamp means for removably securely said tube member to an upper end of a backrest of a front seat of said automobile.

* * * * *